Figure 1:
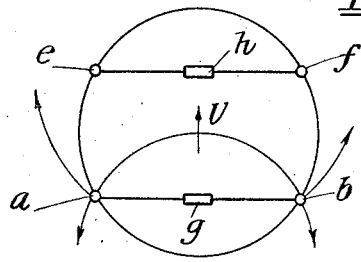

W. HAHNEMANN.
WIRELESS TELEGRAPHY OR TELEPHONY.
APPLICATION FILED FEB. 10, 1913.

1,173,957.

Patented Feb. 29, 1916.

Witness

Inventor
WALTER HAHNEMANN
By his Attorneys

UNITED STATES PATENT OFFICE.

WALTER HAHNEMANN, OF KIEL, GERMANY.

WIRELESS TELEGRAPHY OR TELEPHONY.

1,173,957.   Specification of Letters Patent.   Patented Feb. 29, 1916.

Application filed February 10, 1913. Serial No. 747,372.

*To all whom it may concern:*

Be it known that I, WALTER HAHNEMANN, engineer, a subject of the King of Saxony, residing at and whose post-office address is 214 Holtenauerstrasse, Kiel, Germany, have invented certain new and useful Improvements Relating to Wireless Telegraphy or Telephony, of which the following is a specification.

This invention relates to wireless telegraphy or telephony, and has reference to wireless systems of the kind in which two plates or the like are placed in the earth or in water at a transmitting station and at a distant receiving station respectively, direct or alternating current being caused to pass between the pair of plates at the transmitting station and the effect of such current upon the pair of plates at the receiving station being indicated or recorded by receiving apparatus of any suitable type.

The influence which the current at the transmitting station has upon the apparatus at the receiving station is dependent upon electrical phenomena that may be considered broadly as of two different kinds, behaving in quite distinct ways. One of these kinds of phenomena takes the form of current lines extending between the plates in the earth or water at the transmitting station. Some of these lines spread out to a considerable distance from the transmitting station, as can be proved by the use of very sensitive instruments. The current lines that cross the plates of the distant receiving station give rise to a difference of potential between them and this difference can be measured or indicated. The phenomenon is in fact a matter of pure current flux, which is, theoretically, established to the full extent when direct current is used at the transmitting station. Practically, however, alternating current is able to afford the requisite flux, provided the frequency is not excessively high relatively to the distance between the transmitting and receiving stations. With this kind of phenomenon, no appreciable effect is produced at a distance in a direction parallel to a line connecting the pair of plates at the transmitting or receiving station and it is not conceivable that a difference of potential in that direction could be found sufficient to utilize for receiving purposes; on the other hand the effect at a distance is a maximum in the direction perpendicular to the connecting line of the transmitting plates. It is to be observed that in this case the effect is limited to a particular direction.

The invention has the purpose to render it possible to secure a uniform transmission by current flux in all directions respectively to arrange the "earths" or electrodes so at sending and receiving stations, that the receiving instrument of a distant station is influenced by signals emitted from the transmission station irrespective of the direction in which the former station is situated relatively to the latter station. In other words, the transmitting apparatus is so arranged as to render it capable of producing practically uniform signaling effects by current flux in all directions, and the receiving apparatus is so arranged as to render it capable of being influenced by current fluxes arriving from any direction. A simple method of solving this problem is found in the arrangement of the electrodes vertically one above the other, and this solution of the problem has been made the subject of a divisional application Serial No. 844,532, filed June 16, 1914.

The present application relates to a second solution, found in the arrangement at the sending station of a group of pairs of subaqueous or ground electrodes which are displaced with respect to each other at equal angles around a common center, so that if two pairs of electrodes are employed straight lines passing through the members of each pair lie at right angles to each other. By supplying alternating current of different phase to each pair, a rotation of the field of electrical energy propagated in form of current flux in the ground or in the water is produced. At the receiving station also a plurality of pairs of "earths" or electrodes is provided the energy received by the various pairs being made to act coöperatively on the detector of the receiving instrument. This arrangement permits signals to be transmitted uniformly in all directions and received from all directions, thus avoiding the limitation as to direction above explained in connection with the wireless transmission of signals to a distance by means of an ordinary current flux where there is no difference of phase in the alternating current employed.

In order to make the invention more readily understood, I will now describe it with reference to the accompanying drawings, wherein—

Figure 2:
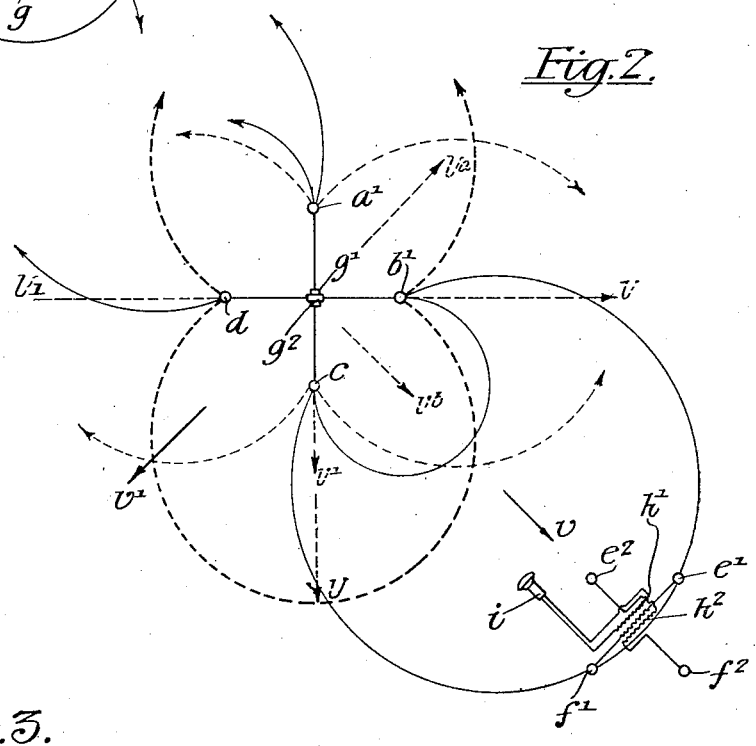
Figure 3:
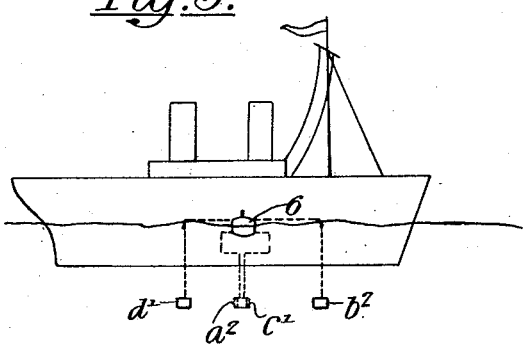

Figure 1 is a diagrammatic illustration of the usual arrangement of "earths" or electrodes at sending and receiving stations to insure the greatest effect by current flux, direct current or alternating currents of the same phase being supplied to the sending electrodes and the field of transmission being indicated. Fig. 2 is a diagrammatic illustration of a sending station and a receiving station corresponding to the invention, each station having pairs of "earths" or electrodes, arranged in the manner above described, and similar electrodes of the sending station being supplied with alternating current of different phase, diagrammatic plans of the rotary field of transmission being marked by different lines. Fig. 3 illustrates a sending station corresponding to the invention arranged on a ship and having two pairs of subaqueous electrodes, the alternating current being supplied by means of a two-phase generator.

The foregoing remarks, regarding the usual arrangement of the "earths" or electrodes may be explained briefly by reference to Fig. 1. In this figure $a$ and $b$ are the two plates of the transmitting station, these plates being buried or submerged at the same depth in earth or water, and $g$ is the transmitting instrument, that is to say the instrument or contrivance by means of which current is passed between the plates $a$ and $b$. $e$ and $f$ are the similarly arranged plates of the receiving station and $h$ is the receiving instrument. The transmitting station would influence the receiving station, if considerably distant, by the effect of current flux as marked by the vector V, not only by means of direct current but also by means of alternating current, provided the frequency is not excessively high, with respect to the distance between the stations. In both cases the maximum transmission is effected in one direction only, viz., in that of the vector V.

The phenomena resulting from the present invention are readily understood from Fig. 2. In this figure the transmitting electrodes are indicated by the reference characters $a^1$, $b^1$, $c$ and $d$; the receiving electrodes by the reference characters $e^1$, $f^1$, $e^2$, $f^2$; $g^1$, $g^2$ are the transmitting instruments and $h^1$, $h^2$ the receiving instruments. Suppose, first, the current is alternating, but of like phase for both pairs of terminal plates $a^1$, $d$ are momentarily positive while plates $c$ and $b^1$ are negative. Lines of force result which extend on the one side from $a^1$ and $d$ to $c$ and $b^1$ on the other side. The maximum transmission effect lies in the direction of the vector $V^a$, marked by thin dotted lines. In the direction of the vector $V^b$, also marked by thin dotted lines, there is no effect. After the lapse of a quarter period both pairs of plates are of the same potential viz., zero. Obviously the vector $V^a$ has also become zero. After a half period the situation is reversed, $c$ and $b^1$ have become positive, while $a^1$ and $d$ have become negative. The vector $V^a$ has again attained its maximum, while $V^b$ is still zero. The maximum transmission is always effected in the direction of the vector $V^a$. Suppose now, for example, a phase difference of 90° is employed for the two pairs of electrodes, and the current is led first to $a^1$ positive, and $c$ negative. At this moment $b^1$ and $d$ are of the same potential, zero. The vector of maximum transmission V marked by thin dotted lines, is at right angles to $a^1=c$, while at right angles to $b^1=d$ the vector $V^1$, also marked by thin dotted lines, is zero. After the lapse of one-eighth of a period the positive potential at $a^1$ has been lowered, and likewise the negative potential at $c$. On the contrary, a potential between $b^1$ and $d$ has arisen and for example $b^1$ may be positive and $d$ negative. The lines of force run now from $a^1$ and $b^1$ on one side to $c$ and $d$ on the other side, while the vector V, marked by fully drawn lines, has rotated through an angle of 45° to the position shown. The maximum transmission effect lies in the direction of this vector and is experienced at the receiving station, the electrodes $e^1$, $f^1$, lying on the same line of force. In the direction of the vector $V^1$, also marked by fully drawn lines, there is no effect. After the lapse of another one-eighth period the potential at $a^1$ and $c$ has become zero, while $b^1$ is positive and $d$ negative. The vector V, marked by thick dotted lines, has rotated 90°. After another one-eighth period the positive potential at $b^1$ has been lowered, and likewise the negative potential at $d$, while between $c$ and $a^1$ a potential has arisen, whereby $c$ is positive and $a^1$ negative. The lines of force run now from $b^1$ and $c$ on one side to $a^1$ and $d$ on the other side and the vector V has rotated a further 45°. The phenomena thus progress until at the expiration of a full period the situation of the start is reëstablished.

From Fig. 3 it is readily understood how the invention may be employed in practice, for instance on a ship. In this figure two pairs of transmitting electrodes $a^2$, $b^2$, $c^1$, $d^1$, like these shown by Fig. 2 are submerged outboard at the same depth in the water, similar electrodes of them being supplied with alternating current of different phase by means of the two-phase generator G.

Obviously more than two pairs of electrodes may be used at each station, and other differences of phase in the current employed. Likewise the angle at which the pairs of electrodes are arranged with relation to each other may be other than a right angle (90°). Both means effect a deformation of the circumference of the field of the vector V. The latter becomes simpler and the more nearly approaches an exact circle, the more electrode pairs there are employed. The phases of the latter must of course follow each other in regular order so as to rotate either in a positive or a negative direction, but always in such manner that pairs lying at right angles to each other have a phase difference of 90°. The vector V thus rotates around the sending station and the transmission is substantially uniform to all points of the compass. That the receiving station must also be provided with pairs of plates angularly displaced about a common center will be obvious when it is considered that although the vector rotates at the sending station only the energy sent out from the transmitting station in the direction in which the receiving instrument lies will be operative in the receiving instrument. Since the receiving apparatus changes its position relatively to the sending station on the change of direction by the ship which carries it (Fig. 3), it is quite possible that a single pair of electrodes, for example, the pair $a^1$, $f^1$, would take up a position at right angles to the direction of the current line emanating from the sending station. Inasmuch as the electrodes $e^1$ and $f^1$ would then both lie in a line of equal potential there would be no difference of potential between the same and consequently no flow of current to the detector. If two pairs of electrodes arranged at right angles to each other, for example, $e^1$, $f^1$, and $e^2$, $f^2$, are employed, however, then whereas one pair $e^1$, $f^1$ operates when the ship is in one position, the other pair $e^2$, $f^2$ operates when the ship has turned on a course at an angle of 90° to its former direction. When the ship lies in a position midway between these extremes both pairs of electrodes operate, the effect between each pair being weaker since the distance between the electrodes of each pair is less in this direction than in the previously mentioned examples in which the effect is maximum. The receiving apparatus may be provided with a connector from both pairs of plates to a single transformer $h^1$, $h^2$, in the secondary circuit of which a telephone $i$ may be arranged. Whatever the frequency employed in the current for the transmission of the signals, it must be confined within well defined limits since the signaling effect is produced by a simple current flux. For practical reasons, the frequency employed for transmission through sea water will not exceed 10,000 periods per second while for the telephonic signals the frequency should not exceed over 2,000 periods per second.

I claim as my invention:

1. In a wireless subaqueous or ground signaling system, pairs of subaqueous or ground electrodes at the sending station between which alternating electric current of different phase and of low frequency may be passed to effect transmission of signals by means of current flux uniformly in substantially all directions, in combination with pairs of subaqueous or ground electrodes at the receiving station influenced by electrical energy in the form of current flux propagated from substantially any direction as described.

2. In a wireless subaqueous or ground signaling system, a sending station comprising at least two pairs of subaqueous or ground electrodes arranged so that straight lines passing through the members of each pair would lie at substantially right angles to each other, and between which alternating current of different phase and of low frequency may be passed, for the purpose described.

3. In a wireless subaqueous or ground signaling system, a sending station comprising at least two pairs of subaqueous or ground electrodes arranged so that straight lines passing through the members of each pair would lie at substantially right angles to each other, and between which alternating current of different phase and of low frequency may be passed, in combination with a receiving station having a similar subaqueous or ground electrodes arrangement; for the purpose described.

4. In a wireless subaqueous or ground signaling system, a sending station comprising at least two pairs of subaqueous or ground electrodes arranged so that straight lines passing through the members of each pair would lie at substantially right angles to each other, in combination with means for supplying said pairs of electrodes with alternating current of different phase and of low frequency for the purpose described.

5. In a wireless subaqueous or ground signaling system of the character described, a sending station having a plurality of pairs of subaqueous or ground electrodes arranged at substantially equal angles around a common center so that straight lines passing through the members of each pair would cut each other in the center, and means for supplying said pairs of electrodes with alternating current differing in phase and of low frequency, for the purpose described.

6. In a wireless subaqueous or ground signaling system of the character described, a sending station having a plurality of pairs of subaqueous or ground electrodes arranged at substantially equal angles around a common center so that straight lines passing through the members of each pair would cut each other in the center, and means for creating a transmission field in form of current flux therefor having a rotating vector of maximum distance propagation substantially as described.

7. In a wireless subaqueous or ground signaling system of the character described, a sending station having a plurality of subaqueous or ground electrodes arranged at substantially equal angles around a common center so that straight lines passing through the members of each pair would cut each other in the center, and means for creating a transmission field in form of current flux therefor having a rotating vector of maximum distance propagation, together with a receiving station having subaqueous or ground electrodes of like arrangement, to receive a signal transmitted by current flux from whatever direction it may arrive.

In testimony whereof I affix my signature in presence of two witnesses.

WALTER HAHNEMANN.

Witnesses:
 JULIUS RÖPKE,
 KARL FRIEDRICH FEUPEL.

Copies of this patent may be obtained for five cents each, by addressing the "Commissioner of Patents, Washington, D. C."